(12) United States Patent
Gardes et al.

(10) Patent No.: US 11,401,886 B2
(45) Date of Patent: Aug. 2, 2022

(54) TURBOFAN COMPRISING A SET OF ROTATABLE BLADES FOR BLOCKING OFF THE BYPASS FLOW DUCT

(71) Applicant: Airbus Operations SAS, Toulouse (FR)

(72) Inventors: Pascal Gardes, Levignac (FR); Wolfgang Brochard, Carbonne (FR); Antoine Boudou, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 185 days.

(21) Appl. No.: 16/845,224

(22) Filed: Apr. 10, 2020

(65) Prior Publication Data

US 2020/0325848 A1 Oct. 15, 2020

(30) Foreign Application Priority Data

Apr. 15, 2019 (FR) ...................................... 1904012

(51) Int. Cl.

| *F02K 1/09* | (2006.01) |
|---|---|
| *F02K 1/72* | (2006.01) |
| *F02K 1/56* | (2006.01) |
| *F02C 9/20* | (2006.01) |
| *F02K 3/075* | (2006.01) |
| *F02K 1/76* | (2006.01) |

(52) U.S. Cl.
CPC ................ *F02K 1/09* (2013.01); *F02K 1/566* (2013.01); *F02K 1/72* (2013.01); *F02C 9/20* (2013.01); *F02K 1/766* (2013.01); *F02K 3/075* (2013.01)

(58) Field of Classification Search
CPC ... F02K 1/70; F02K 1/72; F02K 1/763; F02K 1/766; F02K 1/566; F02K 1/60; F02K 1/62; F02K 1/09; F02K 3/075; F02K 1/64; F01D 7/00
See application file for complete search history.

(56) References Cited

U.S. PATENT DOCUMENTS 2,933,890 A * 4/1960 Morrison ................ F02K 1/625
138/45
3,620,022 A * 11/1971 Beale ........................ F02K 1/70
60/229

(Continued)

OTHER PUBLICATIONS

French Search Report; priority document.

*Primary Examiner* — Thomas P Burke
(74) *Attorney, Agent, or Firm* — Greer, Burns & Crain, Ltd.

(57) ABSTRACT

A turbofan having a nacelle including a slider translationally mobile to open a window between a duct and the exterior, a plurality of blades, each rotationally mobile on the slider, and a maneuvering system moving each blade and comprising for each blade, a shaft rotationally mobile on the slider and onto which the blade is fixed, an arm having a first end fixed to the shaft, an arc coaxial with the longitudinal axis, mounted rotationally mobile on the slider about the longitudinal axis, a rectilinear rod fixed by its base to the arc, the rectilinear rod inserted into a through-bore of a stock, wherein the stock is mounted translationally free relative to the rectilinear rod, and the stock is mounted rotationally free on the arm at its second end about a rocking axis parallel to the rotational axis, and an actuation system producing arc rotation in two opposite directions.

4 Claims, 2 Drawing Sheets

(56) References Cited

U.S. PATENT DOCUMENTS

| | | | |
|---|---|---|---|
| 4,030,290 A | 6/1977 | Stachowiak | |
| 10,830,089 B2* | 11/2020 | Gardes | F02K 1/72 |
| 11,187,190 B2* | 11/2021 | Cazeaux | F02K 1/763 |
| 11,193,379 B2* | 12/2021 | Gardes | F02K 1/72 |
| 11,220,978 B2* | 1/2022 | Gardes | F02K 1/09 |
| 2016/0069204 A1* | 3/2016 | Izquierdo | F01D 17/162 |
| | | | 415/68 |
| 2017/0107944 A1* | 4/2017 | Kawai | F02K 3/06 |
| 2017/0198658 A1* | 7/2017 | Higgins | F02K 1/60 |
| 2018/0274484 A1* | 9/2018 | Ridray | F02K 1/763 |
| 2020/0240359 A1* | 7/2020 | Gardes | F02K 1/383 |
| 2021/0207557 A1* | 7/2021 | Czapla | F02K 1/763 |

\* cited by examiner

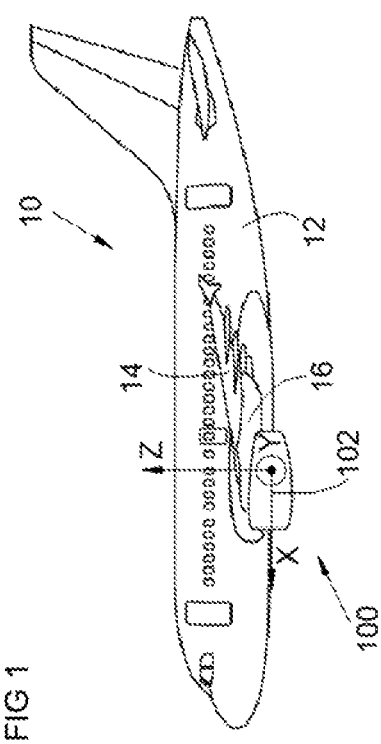

TURBOFAN COMPRISING A SET OF ROTATABLE BLADES FOR BLOCKING OFF THE BYPASS FLOW DUCT

CROSS-REFERENCES TO RELATED APPLICATIONS

This application claims the benefit of the French patent application No. 1904012 filed on Apr. 15, 2019, the entire disclosures of which are incorporated herein by way of reference.

FIELD OF THE INVENTION

The present invention relates to a turbofan which comprises a set of blades which are mounted so as to be able to rotate in order to block the duct for the bypass flow, and to an aircraft comprising at least one such turbofan.

BACKGROUND OF THE INVENTION

An aircraft includes a fuselage, to each side of which is fixed a wing. Under each wing is suspended at least one turbofan. Each turbofan is fixed under the wing by means of a pylon that is fixed between the structure of the wing and the structure of the turbofan.

The turbofan comprises a motor and a nacelle that is fixed around the motor. The turbofan has, between the nacelle and the motor, a bypass duct in which a bypass flow flows.

The nacelle comprises a plurality of reversal doors, each one being mobile in rotation on the structure of the nacelle, between a stowed position in which it is not in the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and more specifically towards the front of the engine in order to generate reverse thrust. Furthermore, the displacement of each reversal door is performed using a connecting rod which passes through the bypass duct in the stowed position and which therefore partially blocks the bypass duct.

Although reversal doors are entirely satisfactory, it is desirable to find different mechanisms, in particular, mechanisms which are more lightweight and which do not present any obstruction to the bypass flow in the stowed position.

SUMMARY OF THE INVENTION

One object of the present invention is to propose a turbofan which comprises a set of blades which are mounted so as to be able to rotate in order to block the duct of the bypass flow.

To that end, a turbofan is proposed having a longitudinal axis and comprising a motor and a nacelle, surrounding the motor, which comprises a fan casing, in which a duct for a bypass flow is delimited between the nacelle and the motor, and in which a flow of air flows in a flow direction, the nacelle comprising:
- a fixed structure fixed to the fan casing,
- a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and an extended position in which the slider is positioned such that the mobile cowl is moved away from the fan casing so as to define, between them, an open window between the duct and the exterior of the nacelle,
- a plurality of blades, each one comprising a first end mounted mobile in rotation on the slider about an axis of rotation and where the blades are gradually offset angularly about the longitudinal axis, where each blade is mobile between a stowed position in which the blade is outside the duct and a deployed position in which the blade is across the duct,
- an assembly of actuators causing the slider to move between the advanced position and the extended position, and vice versa, and
- a maneuvering system intended to move each blade from the stowed position to the deployed position and vice versa, where the maneuvering system comprises:
  - for each blade, a shaft mounted mobile in rotation on the slider about an axis of rotation, and onto which the blade is fixed,
  - for each shaft, an arm which has a first end fixed to the shaft and a second end,
  - an arc coaxial with the longitudinal axis, mounted mobile in rotation on the slider about the longitudinal axis,
  - for each arm, a rectilinear rod fixed by its base to the arc,
  - for each rectilinear rod, a stock having a through-bore into which the rectilinear rod is inserted, in which the stock is mounted free in translation relative to the rectilinear rod, and in which the stock is mounted free in rotation on the arm at its second end about a rocking axis parallel to the axis of rotation, and
  - an actuation system which produces the rotation of the arc in one direction and in the other.

An engine of this kind permits a reduction in mass by replacing the reversal doors and their drive mechanisms with more lightweight pivoting blades having a simplified maneuvering system.

Advantageously each rectilinear rod extends from its base radially about the longitudinal axis over an outer perimeter of the arc.

Advantageously, each arm is composed of two paddles at a distance from one another parallel to the axis of rotation, the stock corresponding to the arm comprises two blocks disposed on either side of the stock and coaxial with the rocking axis, and each block is mounted free in rotation in a drill-hole that each paddle includes for that purpose.

The invention also proposes an aircraft comprising at least one turbofan in accordance with one of the above variants.

BRIEF DESCRIPTION OF THE DRAWINGS

The abovementioned features of the invention, along with others, will become more clearly apparent on reading the following description of one exemplary embodiment, the description being given with reference to the appended drawings, in which:

FIG. 1 is a side view of an aircraft comprising a turbofan according to the invention, FIG. 2 is a perspective view of the turbofan according to the invention in the advanced and stowed position.

DETAILED DESCRIPTION OF THE PREFERRED EMBODIMENTS

Figure 5:
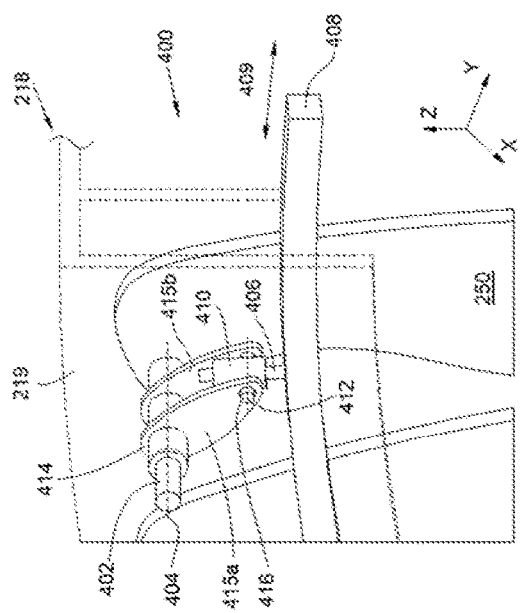
FIG. 5 is a perspective view of a maneuvering system according to the invention.

In the following description, the terms relating to a position refer to the direction of flow of the air in an engine which therefore flows from the front to the rear of the aircraft.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 3:
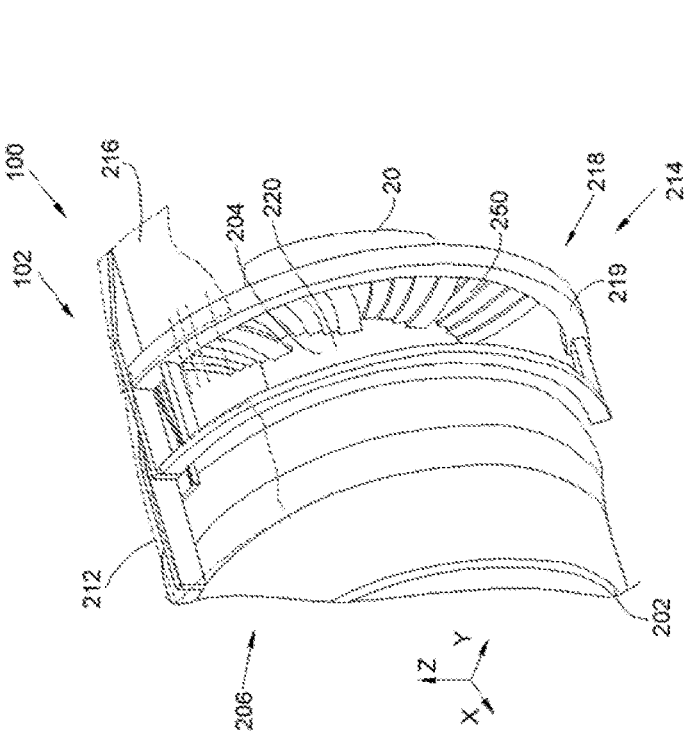
FIG. 3 is a perspective view of the turbofan according to the invention in the extended and deployed position.

FIG. 2 and FIG. 3 show the turbofan 100 which has a nacelle 102 and a motor 20 which is housed inside the nacelle 102 and comprises a fan casing 202. The motor 20 is represented by its rear exhaust part.

In the following description, and by convention, X denotes the longitudinal axis of the turbofan 100 that is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 4:
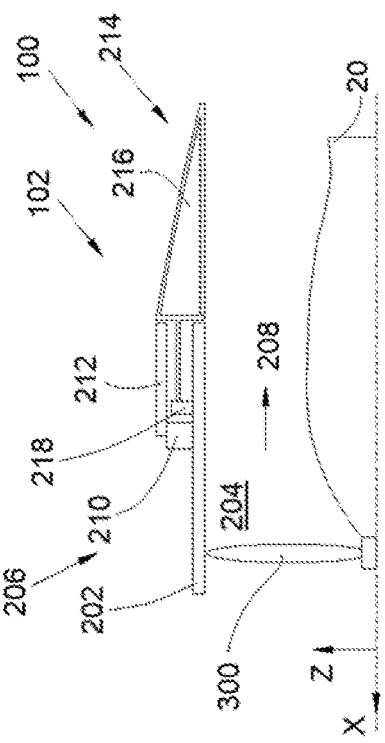
FIG. 4 is a schematic representation of a turbofan according to the invention, viewed in vertical section.

FIG. 2 and FIG. 3 show the turbofan 100 in two different use positions, and FIG. 4 shows a schematic representation in section of the turbofan 100.

The turbofan 100 has, between the nacelle 102 and the motor 20, a duct 204 in which flows a bypass flow 208 coming from the air intake through a fan 300, and which therefore flows in the flow direction from forward to rear.

The nacelle 102 has a fixed structure 206 that is mounted fixed on the fan casing 202. Here in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan 100.

The slider 218 is mounted mobile in translation in a translation direction globally parallel to the longitudinal axis X on the fixed structure 206 of the nacelle 102.

The slider 218 is mobile between an advanced position (FIG. 2) and an extended position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the tended position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the extended position, the mobile cowl 216 and the fan casing 202, and the outer panels 212, are spaced apart from one another and define, between them, the open window 220 between the duct 204 and the exterior of the nacelle 102.

That is to say, the air from the bypass flow 208 passes through the window 220 to end up outside the turbofan 100.

The slider 218 is made to translate by any appropriate means, such as slideways between the fixed structure 206 and the slider 218.

The nacelle 102 also comprises a set of actuators (not shown) that move the slider 218 in translation between the advanced position and the extended position and vice versa. Each actuator is controlled by a control unit, for example of the processor type, which controls the movements in one direction or the other according to the requirements of the aircraft 10.

Each actuator may for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each being mounted so as to be able to rotate on the slider 218 about an axis of rotation that is in this case generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the motor 20 when the blade 250 is deployed so as to best block the duct 204.

The blades 250 are gradually offset angularly about the longitudinal axis X.

The number of blades 250, and the shape of each of these, depend on the dimensions of the turbofan 100 and on the width of each blade 250 in order that, in the deployed position, the blades 250 block the majority of the duct 204.

Passage from the stowed position to the deployed position is brought about by rotation of the blade 250 towards the interior of the engine 100.

The stowed position can be adopted when the slider 218 is in the advanced position or the extended position. The deployed position can be adopted only when the slider 218 is in the extended position.

The slider 218 also has a maneuvering system 400 which moves each blade 250 from the stowed position to the deployed position and vice versa.

Thus, operation comprises, starting from the advanced/stowed position, ordering activation of the actuators to move the slider 218 from the advanced position to the extended position. During or at the end of this movement, the maneuvering system 400 moves the blades 250 from the stowed position to the deployed position.

Conversely, operation thus comprises, starting from the extended/deployed position, ordering activation of the actuators to move the slider 218 from the extended position to the advanced position. During or at the start of this movement, the maneuvering system 400 moves the blades 250 from the deployed position to the stowed position.

The use of the blades 250 mounted so as to be able to rotate on the slider 218 makes it possible to lighten the assembly compared to the use of reversal doors of the prior art.

FIG. 5 shows the maneuvering system 400 on the mobile assembly 214 and more particularly on the slider 218.

For each blade 250, the maneuvering system 400 comprises a shaft 402 which is mounted mobile in rotation on the slider 218 about an axis of rotation 404, and onto which the blade 250 is fixed. In FIG. 5, each blade 250 is truncated to simplify the understanding of the mechanism and only two blades 250 are shown. Furthermore, in FIG. 5, the slider 218 is seen in cross section. The axis of rotation 404 is in this case generally parallel to the longitudinal axis X.

For each shaft 402, the maneuvering system 400 also comprises and arm 414 which has a first end fixed to the shaft 402 and a second end.

In the embodiment of the invention presented in FIG. 5, the arm 414 is composed of two paddles 415a-b at a distance from one another parallel to the axis of rotation 404.

The maneuvering system 400 also comprises an arc 408 which is coaxial with the longitudinal axis X. The arc 408 is mounted mobile in rotation (double arrow 409) on the mobile assembly 214 and, more particularly, on the slider 218 about the longitudinal axis X.

The maneuvering system 400 also comprises an actuation system 411 which produces the rotation of the arc 408 in one direction and in the other. The actuation system 411 can be produced, for example, using a rail fixed to the fixed structure 206 and a trolley secured to the arc 408 and which is guided by the rail and in which the rail has a suitable form which makes it possible to displace the trolley, and therefore the arc 408, upon the displacement from the stowed position to the deployed position.

The actuation system 411 can also take other forms such as a cylinder which displaces the arc 408, a motor equipped with a rack, etc.

For each arm 414, that is to say, each blade 250, the maneuvering system 400 also comprises a rectilinear rod 406 fixed by its base to the arc 408. In the embodiment of the invention presented in FIG. 5, the rectilinear rod 406 extends from its base radially about the longitudinal axis X over the outer perimeter of the arc 408.

For each rectilinear rod 406, the maneuvering system 400 also comprises a stock 410 having a through-bore into which the rectilinear rod 406 is inserted and the stock 410 is mounted free in translation relative to the rectilinear rod 406.

The stock 410 is, moreover, mounted free in rotation on the arm 414 at its second end about a rocking axis 412 parallel to the axis of rotation 404. In the embodiment of the invention presented here, the stock 410 comprises two blocks 416 disposed on either side of the block 410 and coaxial with the rocking axis 412, in which each block 416 is mounted free in rotation in a drill-hole that each paddle 415a-b comprises for that purpose.

Thus, a rotational displacement of the arc 408 causes the rotation of each rectilinear rod 406 about the longitudinal axis X. Since each stock 410 is free in rotation and in translation relative to the corresponding rectilinear rod 406, the rotation of the rectilinear rod 406 causes the rotation of the associated arm 414 and therefore of the associated shaft 402 and of the associated blade 250.

The displacement of all the blades 250 is then relatively simple to implement because it is sufficient to perform a rotation of the arc 408.

In the embodiment of the invention presented in FIG. 5, the slider 218 comprises a U-shaped profile 219 coaxial with the longitudinal axis X and open towards the longitudinal axis X. The U-shaped profile 219 is shown transparently in FIG. 5 and it forms a cage in which the blades 250 are mounted mobile in rotation and where the shafts 402 are mounted mobile in rotation in the walls of the U-shaped profile 219.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising a motor and a nacelle, surrounding the motor, which comprises a fan casing, in which a duct for a bypass flow is delimited between the nacelle and the motor and in which a flow of air flows in a flow direction, said nacelle comprising:
   a fixed structure fixed to the fan casing,
   a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and an extended position in which the slider is positioned such that the mobile cowl is moved away from the fan casing to define, between them, an open window between the duct and an exterior of the nacelle,
   a plurality of blades, each blade comprising a first end mounted mobile in rotation on the slider about an axis of rotation and where the plurality of blades are gradually offset angularly about the longitudinal axis, where each blade is mobile between a stowed position in which the blade is outside the duct and a deployed position in which the blade is across the duct,
   an assembly of actuators causing the slider to move between the advanced position and the extended position, and vice versa, and
   a maneuvering system configured to move each blade from the stowed position to the deployed position and vice versa, where the maneuvering system comprises:
      for each blade, a shaft mounted mobile in rotation on the slider about an axis of rotation, and onto which the blade is fixed,
      for each shaft, an arm which has a first end fixed to the shaft and a second end,
      an arc coaxial with the longitudinal axis, mounted rotatably mobile on the slider about the longitudinal axis,
      for each arm, a base of a rectilinear rod is fixed to the arc,
      for each rectilinear rod, a stock having a first end, a second end, and a through-bore into which the rectilinear rod is inserted, in which the stock is mounted free in translation relative to the rectilinear rod, and in which the second end of the stock is mounted free in rotation on the arm about a rocking axis parallel to the axis of rotation, and an actuation system which produces rotation of the arc in one direction and in an opposite direction.

2. The turbofan according to claim 1, wherein a base of each rectilinear rod extends radially about the longitudinal axis over an outer perimeter of the arc.

3. The turbofan according to claim 1, wherein each arm is composed of two paddles that are at a distance from one another parallel to the axis of rotation, wherein each paddle comprises a drill-hole, wherein the stock corresponding to said arm comprises two blocks disposed on either side of the stock and coaxial with the rocking axis, and wherein each block is mounted free in rotation in the drill-hole of a respective paddle.

4. An aircraft comprising at least one turbofan according to claim 1.

* * * * *